(12) United States Patent
Tarui et al.

(10) Patent No.: US 7,401,726 B2
(45) Date of Patent: Jul. 22, 2008

(54) BRAZING METHOD

(75) Inventors: Hiroki Tarui, Kariya (JP); Masafumi Takahashi, Nagoya (JP); Tsuguharu Shimpo, Owariasahi (JP); Koji Onouchi, Gamagori (JP); Hiroshi Ogawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/965,077

(22) Filed: Oct. 14, 2004

(65) Prior Publication Data

US 2005/0082350 A1    Apr. 21, 2005

(30) Foreign Application Priority Data

Oct. 16, 2003    (JP) .............................. 2003-356866

(51) Int. Cl.
*B23K 31/00*    (2006.01)
(52) U.S. Cl. .................................. 228/248.1
(58) Field of Classification Search .............. 228/262.6, 228/262.61, 248.1, 183, 257; 138/113
See application file for complete search history.

(56) References Cited

U.S. PATENT DOCUMENTS

| | | | | |
|---|---|---|---|---|
| 2,566,339 | A | * | 9/1951 | Klinker ........................ 148/22 |
| 3,948,431 | A | | 4/1976 | Niimi et al. .................. 228/173 |
| 4,381,590 | A | | 5/1983 | Nonnenmann et al. |
| 4,521,947 | A | | 6/1985 | Nonnenmann et al. |
| 4,674,566 | A | * | 6/1987 | Heine et al. ............... 165/134.1 |
| 4,694,864 | A | | 9/1987 | Libin .......................... 138/113 |
| 5,180,098 | A | * | 1/1993 | Halstead et al. ............. 228/183 |
| 5,251,374 | A | * | 10/1993 | Halstead et al. ........ 29/890.047 |
| 5,378,294 | A | * | 1/1995 | Rissanen ..................... 148/433 |
| 5,501,391 | A | | 3/1996 | Wieres |
| 5,777,259 | A | * | 7/1998 | Mennucci et al. .......... 174/16.3 |

(Continued)

FOREIGN PATENT DOCUMENTS

JP    54-16352    2/1979

(Continued)

OTHER PUBLICATIONS

Lashko, N.F., et al Paika Metallv (Brazing Of Metals).—Moscow, The State Publishers For Scientific and Technical Literature, 1959, p. 17-18, pp. 286-287, and p. 306, Table 83 (with partial translations).

(Continued)

*Primary Examiner*—Kevin P Kerns
*Assistant Examiner*—Michael Aboagye
(74) *Attorney, Agent, or Firm*—Harness, Dickey & Pierce, PLC

(57) ABSTRACT

For integrally bonding a first member and a second member made of copper or a copper alloy by brazing, a paste brazing material composed essentially of copper (Cu), tin (Sn), nickel (Ni) and phosphorus (P) is beforehand applied to at least one of the first and second members. A base material is exposed at the whole or a part of a contact portion between the first and second members. Thereafter, the first and second members are assembled at a predetermined position, and heated at a temperature in a range of 600° C.-800° C. within a reducing atmosphere furnace. By the brazing method, an oxide film on the surface of the base material can be sufficiently removed, so that the paste brazing material can smoothly flow on the surface at the contact portion.

7 Claims, 5 Drawing Sheets

U.S. PATENT DOCUMENTS

| | | | | |
|---|---|---|---|---|
| 5,853,902 | A * | 12/1998 | Usui | 428/593 |
| 6,059,174 | A * | 5/2000 | Kojima et al. | 228/183 |
| 6,182,746 | B1 * | 2/2001 | Wiese | 165/166 |
| 6,221,506 | B1 * | 4/2001 | Guerlet et al. | 428/596 |
| 6,342,106 | B1 * | 1/2002 | Koch et al. | 148/24 |
| 6,660,401 | B2 * | 12/2003 | Hsu | 428/593 |
| 6,761,306 | B2 * | 7/2004 | Ishio et al. | 228/262.61 |
| 2001/0013390 | A1 | 8/2001 | Staubwasser | |
| 2002/0129890 | A1 | 9/2002 | Staubwasser | |
| 2003/0001000 | A1 | 1/2003 | Shabtay | |
| 2004/0040153 | A1 | 3/2004 | Ashida et al. | 29/890.03 |

FOREIGN PATENT DOCUMENTS

| | | |
|---|---|---|
| JP | 56-033168 | 4/1981 |
| JP | 57-171570 | 10/1982 |
| JP | 05-200308 | 8/1993 |
| JP | 6-297136 | 10/1994 |
| JP | 10-054682 | 2/1998 |
| JP | 10-202391 | 8/1998 |
| JP | 2000-135558 | 5/2000 |
| JP | 2000-197990 | 7/2000 |
| JP | 2000-197990 A * | 7/2000 |
| JP | 2000-271735 | 10/2000 |
| RU | 2153407 C2 | 7/2000 |
| SE | WO 02/090032 * | 11/2002 |
| SE | WO 02/090032 A1 * | 11/2002 |
| WO | WO 96/07521 | 3/1996 |

OTHER PUBLICATIONS

Office Action issued on Jun. 30, 2006 in the corresponding Chinese Patent Application No. 200410085295.3.

Office Action dated Jun. 30, 2006 in the corresponding Russian Application No. 2004130345.

Examination Report dated Oct. 17, 2006 in the corresponding UK Patent Application No. GB0422986.0.

Office Action dated Nov. 6, 2007 in Japanese application no. 2003-356866.

* cited by examiner

BRAZING METHOD

CROSS REFERENCE TO RELATED APPLICATION

This application is based on Japanese Patent Application No. 2003-356866 filed on Oct. 16, 2003, the disclosure of which is incorporated herein by reference.

FIELD OF THE INVENTION

The present invention relates to a brazing method which is suitably used for a heat exchanger made of copper or a copper alloy.

BACKGROUND OF THE INVENTION

A paste brazing material is used for integrally bonding members made of copper or a copper alloy by brazing. As described in JP-A-2000-197990, the paste brazing material is formed by mixing a high-molecular polymer and an organic solvent together with an alloy powder composed of phosphorus (P), nickel (Ni), tin (Sn) and copper (Cu). The paste brazing material is beforehand applied to an entire surface of a metal base material (i.e., copper alloy plate) to be bonded. Thereafter, the metal base material is heated for 5-10 minutes at temperature equal to or below 700° C. in vacuum or a reducing atmosphere furnace.

In this case, flux is not used, so that the melting point of the brazing material becomes low and cost of the brazing material is reduced.

However, the above-described brazing method is used only for a case where the brazing members have a simple flat plate shape. When an actual machine such as a heat exchanger is bonded by using the brazing method, an oxide film on the surface of a metal base material having a complex shape cannot be sufficiently removed by using the reducing gas and phosphorus (P) in the brazing material. Therefore, the brazing material cannot smoothly flow, and the bonding members of the actual machine cannot be sufficiently bonded.

SUMMARY OF THE INVENTION

In view of the above-described problems, it is an object of the present invention to provide a brazing method by which an oxide film on a surface of a metal base material can be sufficiently removed and a brazing material can smoothly flow on the surface of the metal base material.

It is another object of the present invention to provide a brazing structure in which an oxide film on a surface of a metal base material can be sufficiently removed and a brazing material can smoothly flow on the surface of the metal base material.

According to an aspect of the present invention, a brazing method is for bonding a first member and a second member made of one of copper and a copper alloy as a base material by brazing using a brazing material. The brazing method includes steps of: applying a paste brazing material composed essentially of copper (Cu), tin (Sn), nickel (Ni) and phosphorus (P) to at least one of the first and second members; temporarily assembling the first and second members at a predetermined position; and heating the assembled first and second members at a temperature in a range of 600° C.-800° C. within a reducing atmosphere furnace. Further, in the applying step of the paste brazing material, the base material is exposed at a contact portion between the first and second members. Accordingly, the oxide film on the surface of the base material can be sufficiently removed by a reducing gas in the reducing atmosphere furnace and phosphorus (P) in the brazing material. Therefore, in the heating step, the melted brazing material near the contact portion can smoothly flow into the contact portion due to capillarity, and thereby the first and second members can be bonded satisfactorily. The brazing method according to the present invention can be effectively used for a heat exchanger in which an inner fluid flows to perform heat exchange with outside air.

In the present invention, the base material can be exposed on the whole contact portion between the first and second members. Alternatively, the base material can be exposed on a part of the contact portion between the first and second members.

For example, the paste brazing material is applied to the first member in plural lines parallel with each other. Further, the second member has an insertion hole into which the first member is inserted in the assembling, and the paste brazing material is applied to a surface of the second member to be positioned in a line that is close to one end side of the insertion hole of the second member. Alternatively, the second member has an insertion hole into which the first member is inserted in the assembling, and the paste brazing material is applied to a surface of the second member around the insertion hole of the second member.

According to another aspect of the present invention, the applying and the assembling are performed to form a gap at a contact portion between the first and second members so that the reducing gas flows in the gap in the heating. In this case, the reducing gas can flow through the gap to remove the oxide film on the base material.

According to a further another aspect of the present invention, a brazing structure includes a first member made of one of copper and a copper alloy as a base material, and a second member made of one of copper and a copper alloy as a base material. The second member is bonded with the first member by brazing using a paste brazing material composed essentially of copper (Cu), tin (Sn), nickel (Ni) and phosphorus (P). In the brazing structure, the paste brazing material is applied to at least one of the first and second members such that the base material of the first and second members is exposed at a contact portion between the first and second members. Accordingly, the oxide film on the surface of the base material can be sufficiently removed by a reducing gas in the reducing atmosphere furnace and phosphorus (P) in the brazing material.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

A preferred embodiment of the present invention will be described referring to FIGS. 1-5. In this embodiment, a brazing method according to the present invention is typically used for a core portion 110 of a radiator 100 (heat exchanger) for cooling an engine (not shown) of a construction machine.

Figure 1:
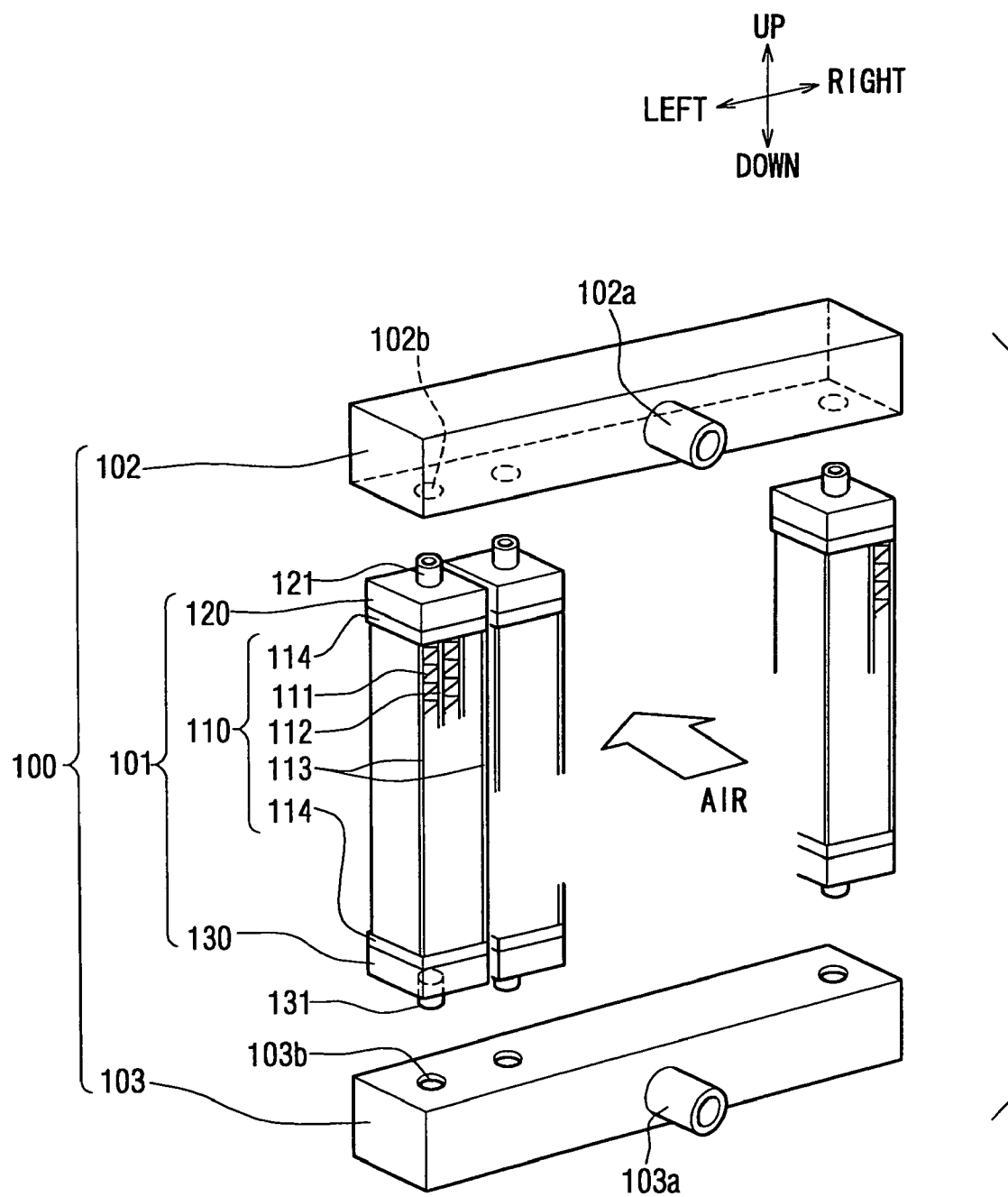
FIG. 1 is a disassembled perspective view showing a radiator according to a preferred embodiment of the present invention.

As shown in FIG. 1, the radiator 100 is provided with at least one radiator unit 101 (e.g., plural radiator units 101 in FIG. 1), a top tank 102 and a bottom tank 103. An inlet pipe 102a of the top tank 102 and an outlet pipe 103a of the bottom tank 103 are connected to the engine through hoses (not shown) made of rubber, respectively.

Members constituting the radiator 100 are integrally bonded by welding or brazing that uses a copper brazing material, which will be described later. In the radiator 100, fins 111 are made of copper, and the other members are made of brass.

The radiator units 101 are provided as a main part of the radiator 100. Each radiator unit 101 includes a core portion 110, an upper tank 120 and a lower tank 130. Here, the number of the radiator units 101 can be changed to correspond to various kinds of engines.

The core portion 110 is a heat-exchanging portion for cooling engine-cooling water (corresponding to an interior fluid in the present invention) flowing from the engine. The core portion 110 is constructed with the fins 111, tubes 112, side plates 113 and core plates 114.

The fins 111 are provided to effectively radiate heat of the cooling water to air. Each of the fins 111 is formed by a thin band plate to have a wave shape in a longitudinal direction (up-down direction in FIG. 1) of the tube 112.

Each of the tubes 112 is formed by bending a thin band plate to define therein a cooling water passage having a flat ellipse-shape section. The end portions of the bent thin plate extending in the longitudinal direction of the tube 112 are bonded by welding. The fins 111 and the tubes 112 are laminated in a laminating direction corresponding to a left-right direction shown in FIG. 1, so that each of the fins 111 is disposed between the adjacent tubes 112. The side plates 113 for reinforcing the core portion 110 are disposed outside of the fins 111 which are positioned on outermost sides in the laminating direction in the core portion 110. Moreover, the tubes 112 and the fins 111 are arranged in plural rows in a cooling air flowing direction indicated by the arrow in FIG. 1.

Figure 3:
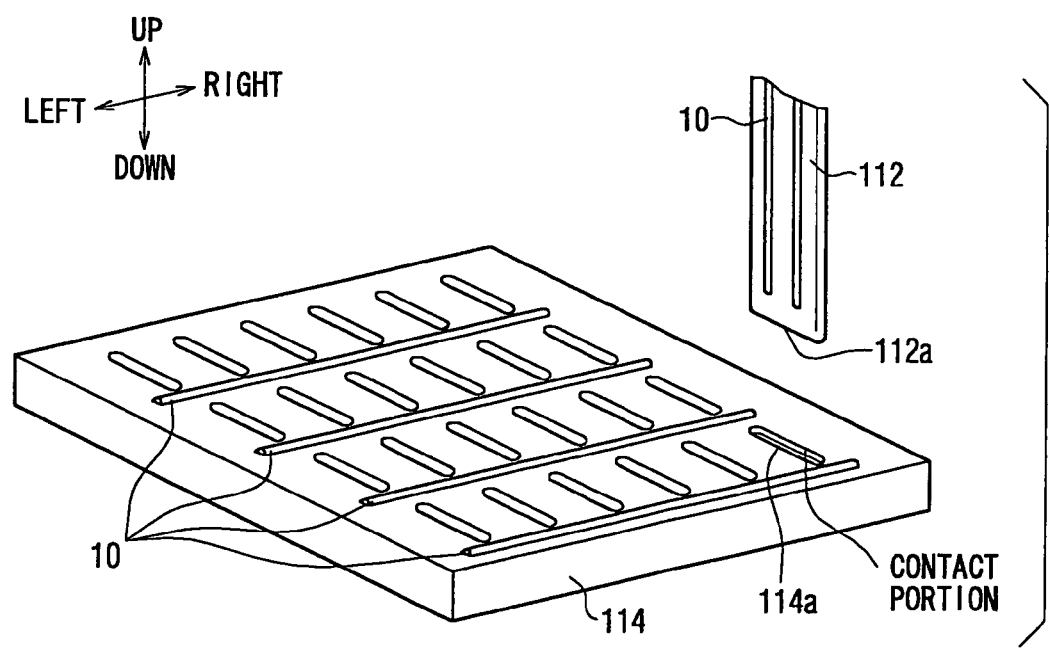
FIG. 3 is a disassembled perspective view showing an applying method of the brazing material to a core plate according to the preferred embodiment of the present invention.
Figure 4:
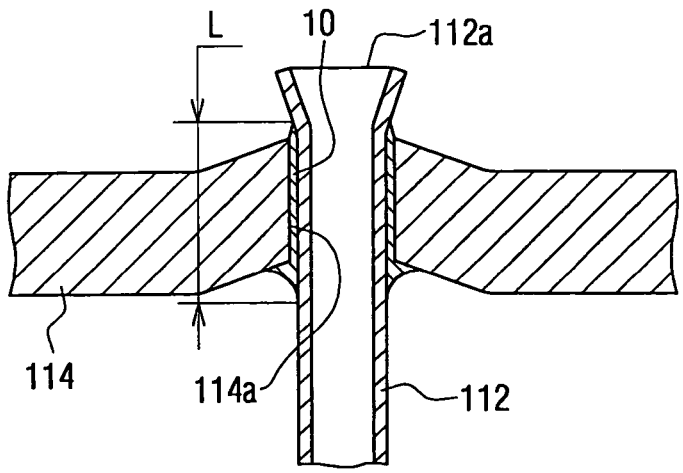
FIG. 4 is a cross-sectional view showing a fillet length of the brazing material at a bonding portion between the tube and the core plate according to the preferred embodiment of the present invention.

The core plate 114, formed by squeezing and bending of a flat plate, is a low box-shape portion having standing edges fitted with an opening portion of the upper tank 120 or the lower tank 130. As shown in FIG. 3, plural tube holes 114a are provided in the core plate 114 at positions corresponding to tube end portions 112a of the longitudinal direction of the tube 112. The tube end portions 112a are inserted into the tube holes 114a to protrude into the upper tank 120 and the lower tank 130, and openings of the tube end portions 112a are enlarged outside as shown in FIG. 4.

Then, the fins 111, the tubes 112, the side plates 113 and the core plates 114 are integrally bonded by brazing.

The upper tank 120 and the lower tank 130 are box-shape containers having the opening portions on the side facing the core plate 114, and the opening portions of the upper and lower tanks 120, 130 are fitted with the core plate 114 to be bonded thereto by welding. As shown FIG. 1, an inflow pipe 121 and an outflow pipe 131, which respectively communicate with the tanks 120 and 130, are bonded by brazing to a top surface of the tank 120 and a bottom surface of the tank 130. The top surface of the tank 120 is arranged opposite to the top tank 102, and the bottom surface of the tank 130 is arranged opposite to the bottom tank 103.

In the example shown in FIG. 1, the plural radiator units 101 are arranged in an arranging direction corresponding to the laminating direction of the fins 111 and the tubes 112.

The top tank 102 and the bottom tank 103 are rectangular parallelepiped containers with a longitudinal direction corresponding to the arranging direction (right-left direction in FIG. 1) of the radiator units 101. An inlet pipe 102a and an outlet pipe 103a, which communicate with the tanks 102 and 103, are connected to side surfaces of the tanks 102 and 103 by brazing, respectively.

As shown in FIG. 1, plural inserting holes 102b and plural inserting holes 103b are provided in a bottom surface of the tank 102 and a top surface of the tank 103, respectively, to correspond to arrangement positions of the inflow pipes 121 and the outflow pipes 131 which will be inserted into the inserting holes 102b and 103b, respectively. The top tank 102 and the bottom tank 103 are bonded to the upper tank 120 and the lower tank 130 by brazing, respectively.

In the radiator 100, the cooling water from the engine flows into the top tank 102 through the inlet pipe 102a, and thereafter flows into the plural radiator units 101 through the inflow pipes 121. While flowing within the plural tubes 112, the cooling water is heat-exchanged with cooing air to be cooled. Here, the heat exchange is improved by the fins 111. Through the outflow pipes 131, the cooling water flows into the bottom tank 103 from the tubes 112. Then, the cooling water in the bottom tank 103 flows to the engine through the outlet pipe 103a.

In this embodiment, a brazing method according to the present invention is suitably used for bonding the members 111-114 to construct the core portion 110.

In this embodiment, a paste brazing material 10 is used. The paste brazing material 10 is formed by mixing a high-molecular organic binder and an alloy powder composed of copper (Cu), tin (Sn), nickel (Ni) and phosphorus (P). The weight ratio of the metals in the alloy powder is set as 75% of Cu, 15% of Sn, 5% of Ni and 5% of P, for example. In this case, the melting point of the brazing material 10 is about 600° C.

The brazing material 10 is beforehand applied to the members 112-114 except for the fins 111. In this embodiment, the brazing material 10 is not applied to the whole or a part of each of contact portions between the members 112-114, for exposing a base material on at least a part or the whole of the contact portions between the members 112-114.

Figure 2:
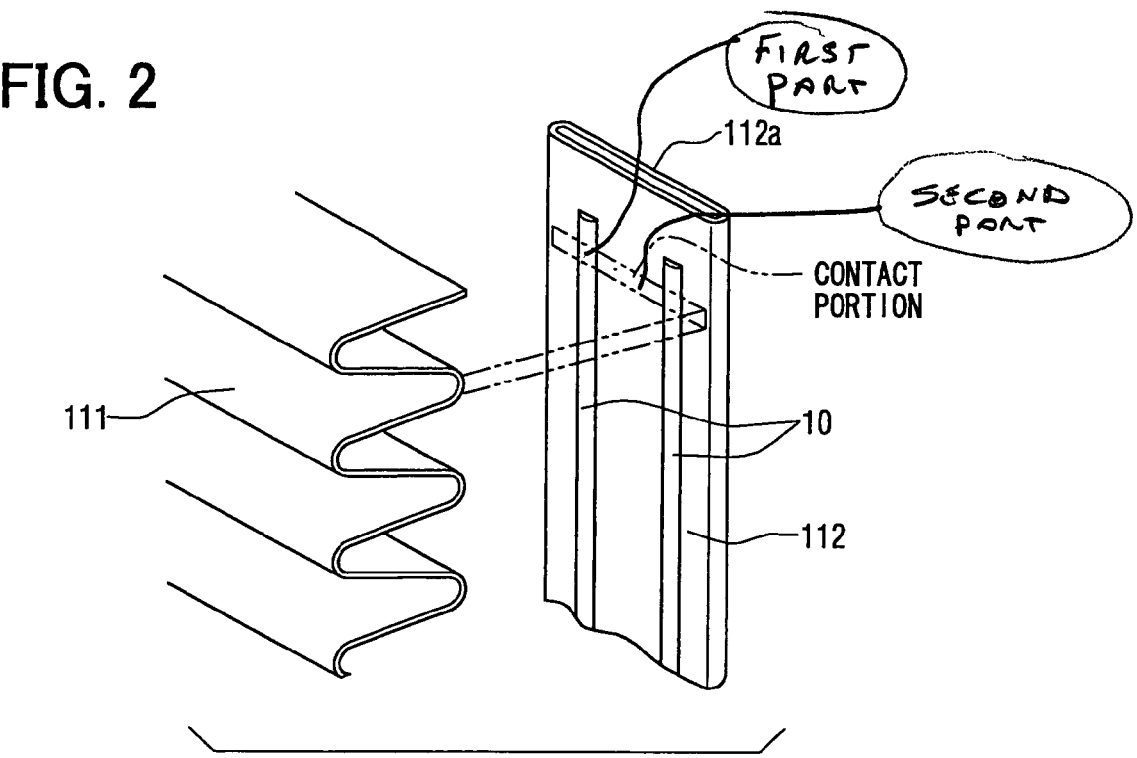
FIG. 2 is a disassembled perspective view showing an applying method of a brazing material to a tube according to the preferred embodiment of the present invention.

As shown in FIG. 2, the brazing material 10 is applied to the tube 112 (e.g., a first member in the present invention) on the surface which contacts the fin 111. Here, the brazing material 10 is applied in plural (for example, two as shown in FIG. 2) lines extending in the longitudinal direction of the tube 112. The plural wave peak portions of the wave-shape fin 111 and the tube 112 are bonded at the contact portion between the tube 112 and the fin 111. In FIG. 2, the area surrounded by two-point chain line on the tube 112 indicates a part of the contact portion between the tube 112 and the fin 111. At the contact portion except for the part where the brazing material 10 is applied, the base material of the tube 112 is not covered by the brazing material 10 and is exposed. In this embodiment, the brazing material 10 is not applied to an area around the tube end portion 112a (e.g., a first member in the present invention) for smoothly inserting the tube end portion 112a into the tube hole 114a provided in the core plate 114.

As shown in FIG. 3, the brazing material 10 is applied to the core plate 114 (e.g., a second member in the present invention) on the surface which faces the tube 112. Here, the brazing material 10 is arranged to extend in the laminating direction (left-right direction in FIG. 3) of the tubes 112, and is close to one end portion in an elongated direction of the tubes hole 114a. In this case, the base material of the core plate 114 is exposed at an inner circumference surface of the tube hole 114a into which the tube end portion 112a is inserted. The brazing material 10 extending in the laminating direction of the tubes 112 is arranged in plural lines in a direction perpendicular to the laminating direction.

Similarly to that of the tube 112, the brazing material 10 is also applied to the side plate 113 on the surface facing the fin 111. Moreover, the brazing material 10 is arranged to extend in a longitudinal direction of the side plate 113, which is not shown by figure here.

The members 111-114 of the radiator 100 are temporarily assembled by fitting at relative positions thereof or temporarily assembled by using fixing members such as jigs.

Thereafter, the temporarily assembled members 111-114 are heated in a reducing atmosphere furnace to be integrally bonded. In the furnace, the longitudinal direction of the tubes 112 is set to be arranged in a horizontal direction, and each of the lines of the brazing material 10 applied to the core plate 114 is positioned on an upper side of the relative tube hole 114a, one end portion of which is close to the line. For example, hydrogen ($H_2$) is used as a reducing gas in the furnace, and the assembled members 111-114 are heated about for 19 minutes at a temperature in a range of 600° C.-800° C.

Accordingly, when the base material is exposed at the contact portions between the members 111-114, an oxide film on the surface of the base material can be sufficiently removed by phosphorus (P) in the brazing material 10 and the reducing gas. Therefore, the melted brazing material 10 around the contact portions can smoothly flow to the contact portions due to capillarity, and thereby the members 111-114 can be bonded satisfactorily. The brazing method according to the present invention is particularly effective for the radiator unit 101, in which the cooling water needs to be sufficiently airproofed at the contact portion between the tube 112 and the core plate 114.

The brazing method described in the present invention can be used for integrally bonding an actual heat exchanger, according to experiments performed by the inventors of the present application. In this case, the connection area between the fin 111 and the tube 112 is increased about by 50% as compared with a comparison example where the brazing material is applied to the whole surface of the base material.

Moreover, in the comparison example, at approximately 40% of the contact portions between the tube end portions 112a and tube holes 114a, the brazing material cannot smoothly flow around. Accordingly, the tubes 112 and the core plate 114 cannot be sufficiently bonded, and the cooling water may be leaked. According to the brazing method of the present invention, the contact portions where the brazing material cannot smoothly flow around can be decreased to 1%-2%.

Figure 5:
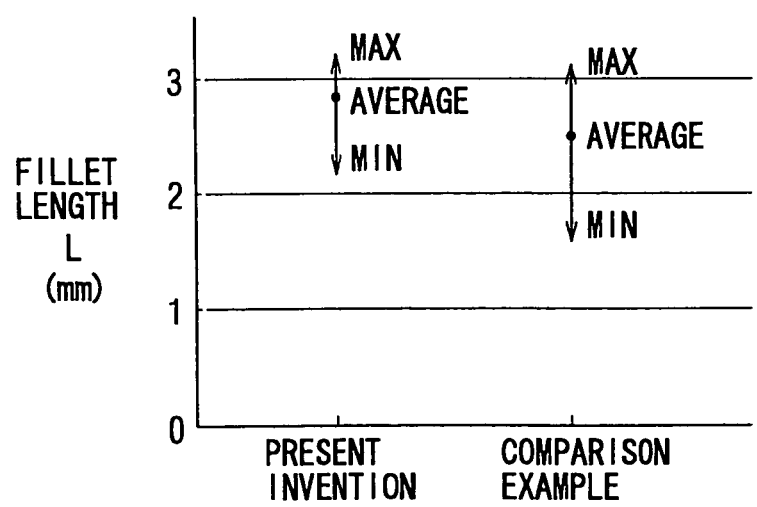
FIG. 5 is a graph showing the fillet length of the brazing material in the present invention and a comparison example.

A fillet length L of the brazing material 10 is shown in FIG. 4 at the contact portion between the tube end portion 112a and the tube hole 114a. FIG. 4 indicates a cross section of the contact portion at an approximate center of the tube hole 114a in the elongated direction of the tube hole 114a or in a short direction of the tube hole 114a. The fillet length L of the present invention is compared with that of the comparison example at fifty positions of the contact portions in each of the cross section at the approximately center of the tube hole 114a in the elongated direction of the tube hole 114a and in the short direction of the tube hole 114a, except for the case where the brazing material 10 cannot sufficiently flow around. As shown in FIG. 5, when plate thickness of the core plate 114 is 2 mm, the fillet length L of the brazing material 10 can be maintained to be equal to or larger than 2 mm according to the present invention, so that the structure difference can be restricted. Moreover, an average value of the fillet length L at the total one hundred positions in the cross section of the tube hole 114a can be increased by 10% compared with that of the comparison example.

In the comparison example, the brazing material 10 is applied to the whole surface of each of the bonding members (e.g., tubes 112 and core plates 114). According to the present invention, the brazing material 10 is applied to a part of the surface of the bonding members so that the base material is exposed at least at a part of the contact portion between the bonding members. Accordingly, the amount of the used brazing material 10 can be decreased in the present invention. For example, the brazing material 10 applied to the tube 112 is at least 200 g/m² in the comparison example. However, according to the present invention, 150 g/m² of the brazing material 10 is sufficient when applied to the tube 112.

In this embodiment, the brazing material 10 is not applied to the area around the tube end portion 112a. Therefore, a gap can be formed at the contact portion between the tube end portion 112a and the core plate 114 so that the reducing gas can flow through the gap to remove the oxide film on the base material.

Other Embodiment

Although the present invention has been fully described in connection with the preferred embodiment thereof with reference to the accompanying drawings, it is to be noted that various changes and modifications will become apparent to those skilled in the art.

Figure 6:
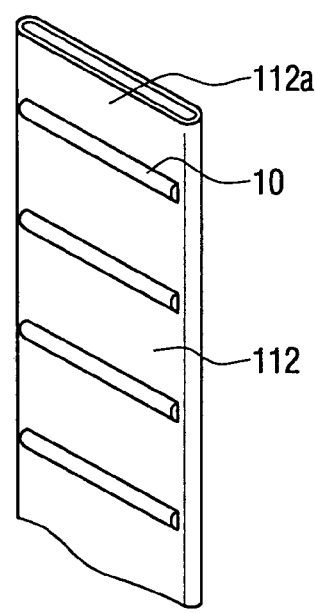
FIG. 6 is a perspective view showing an applying method of a brazing material to a tube according to a modification of the preferred embodiment of the present invention.

For example, when the brazing material 10 is applied to the tube 112, the brazing material 10 is arranged in the plural lines each of which extends in the longitudinal direction of the tube 112 as described above in FIG. 2. However, the present invention is not limited to this. As shown in FIG. 6, the brazing material 10 can be also arranged in plural lines each of which extends in a major direction of the flat ellipse-shape section of the tube 112. Furthermore, the distance between the adjacent lines can be set to be different from that between the adjacent wave peak portions of the wave-shape fin 111.

Figure 7:
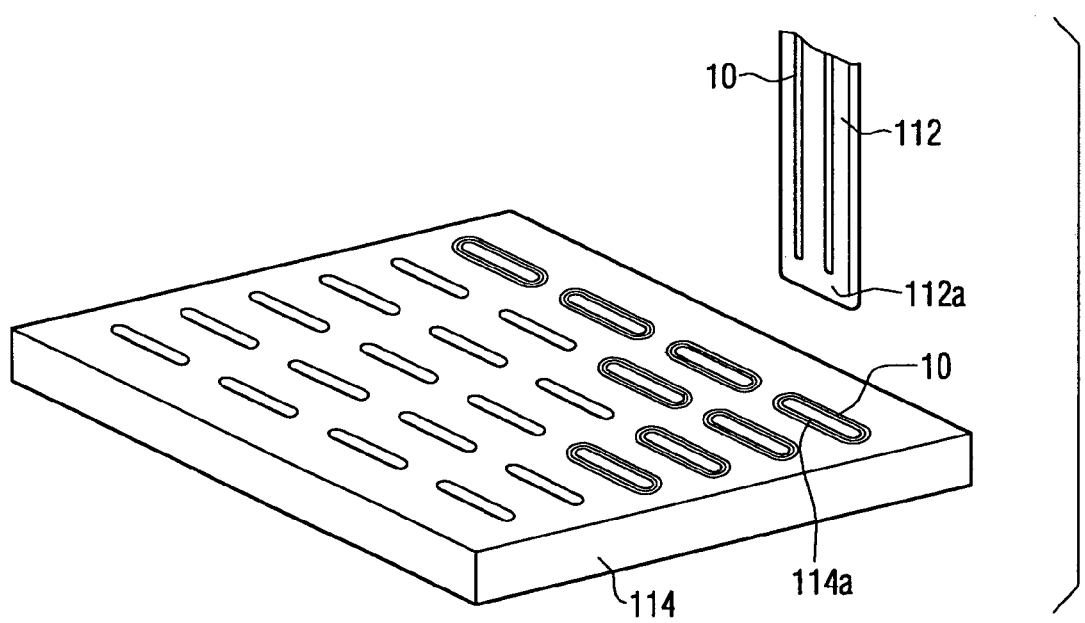
FIG. 7 is a disassembled perspective view showing an applying method of a brazing material to a core plate according to another modification of the preferred embodiment of the present invention.
Figure 8:
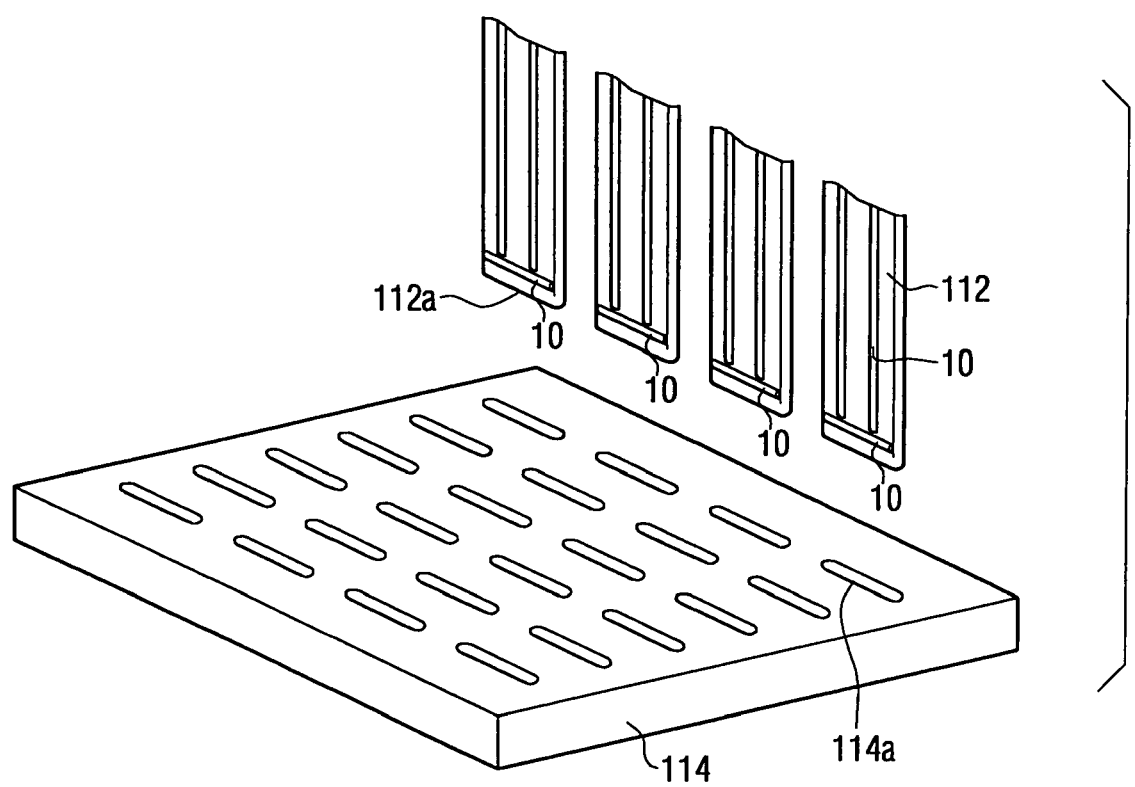
FIG. 8 is a disassembled perspective view showing an applying method of a brazing material to a tube according to a further another modification of the preferred embodiment of the present invention.

Moreover, when the brazing material 10 is applied to the core plate 114, the brazing material 10 can be also arranged around the tube holes 114a as shown in FIG. 7. Furthermore, as shown in FIG. 8, the brazing material 10 can be not applied to the core plate 114, but be applied near the tube end portions 112a of the tubes 112 except for the part which is inserted into the tube holes 114a.

Moreover, in the above-described embodiment, hydrogen is used as the reducing gas. Carbon monoxide (CO) or the like can be also used as the reducing gas.

Moreover, according to the above-described embodiment, the brazing method is suitably used for the radiator 100 of the construction machine. The brazing method can be also suitably used for a radiator of a vehicle or a house. Furthermore, instead of the radiator 100, the brazing method can be also suitably used for other heat exchangers such as an intercooler, a condenser or a heat core.

Such changes and modifications are to be understood as being within the scope of the present invention as defined by the appended claims.

What is claimed is:

1. A brazing method for bonding a first member and a second member made of one of copper or a copper alloy as a base material by brazing using a brazing material, comprising:

applying a plurality of lines of paste brazing material spaced from each other and extending in a direction crossing a contact portion defined by the first member and a contact portion defined by the second member to at least one of the first and second members, the plurality of lines of paste brazing material being between opposite ends of the contact portions defined by the first and second members, the plurality of lines of brazing material defining a first part of each of the contact portions to which the brazing material is applied and a second part of the contact portions to which the brazing material is not applied, the paste brazing material consisting essentially of copper (Cu), tin (Sn), nickel (Ni) and phosphorus (P);

temporarily assembling the first and second members at a predetermined position;

heating the assembled first and second members at a temperature in a range of 600° C.-800° C. within a reducing atmosphere furnace, exposing the second part of the contact portions defined by the first and second members to a reducing gas in the reducing atmosphere furnace during the heating step;

removing an oxide film from a surface of the second part of the contact portions defined by the first and second members using the reducing gas in the reducing atmosphere furnace; and melting the plurality of lines of the paste brazing material to allow the melted paste brazing material to flow to the second part of the contact portions defined by the first and second members to form a fillet and bond the first and second members.

2. The brazing method according to claim 1, wherein the first and second members are assembled to construct a heat exchanger in which an inner fluid flows.

3. The brazing method according to claim 1, wherein the line of paste brazing material is applied to the first member in plural lines parallel with each other.

4. The brazing method according to claim 1, wherein a thickness of the first member is larger than a thickness of the second member and the plurality of lines of brazing material are applied to the first member.

5. The brazing method according to claim 4, wherein the first member is made of brass and the second member is a Cu material.

6. The brazing method according to claim 1, wherein the plurality of lines of brazing material are a plurality of straight lines.

7. The brazing method according to claim 1, wherein the contact portions are continuous contact portions.

* * * * *